Oct. 2, 1956
K. L. DARRAH
2,765,040
COUNTER-ROTATING PROPELLER DRIVE
Filed Sept. 28, 1953
2 Sheets-Sheet 2
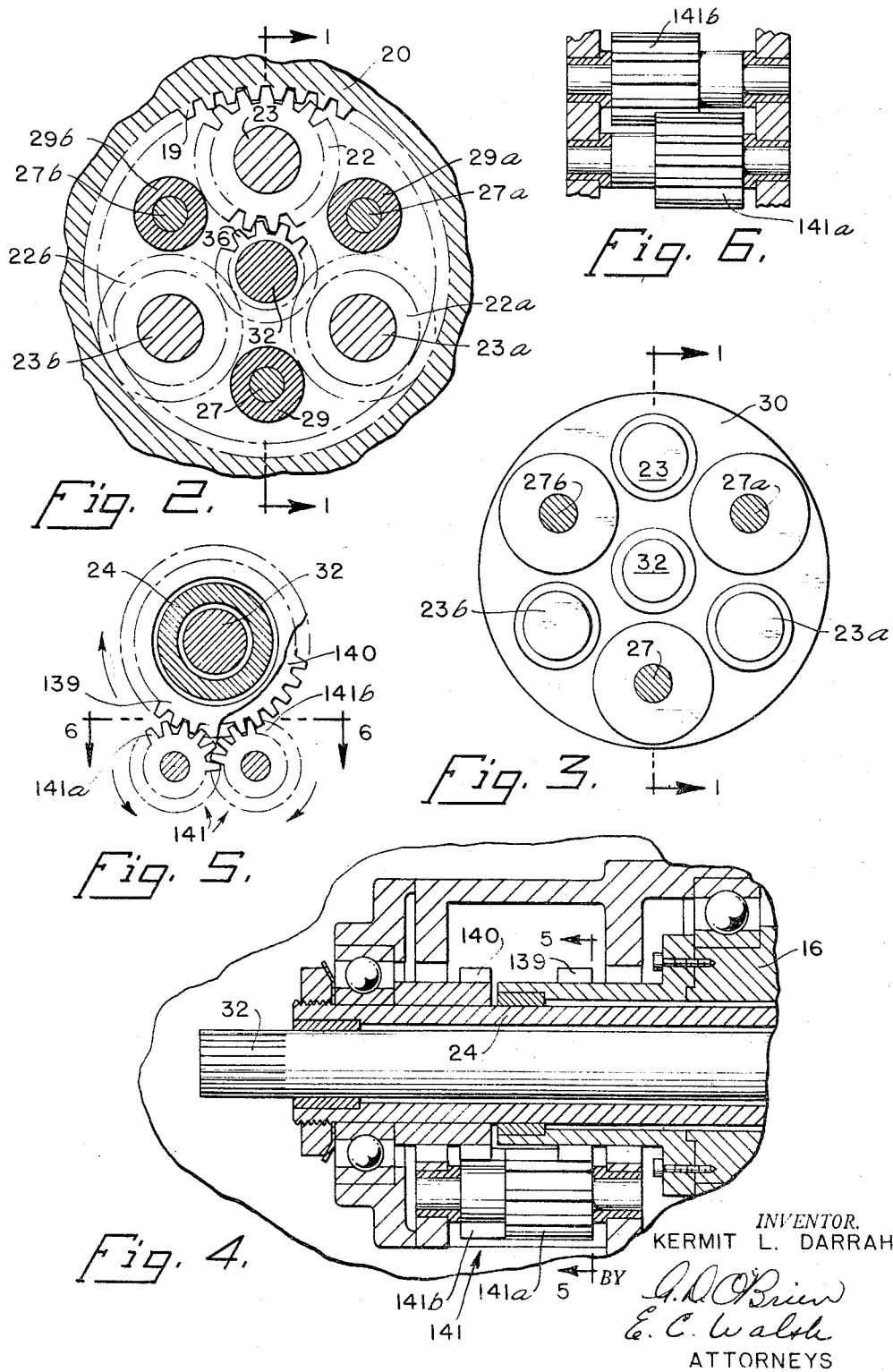
INVENTOR.
KERMIT L. DARRAH
BY
G. D. O'Brien
E. C. Walsh
ATTORNEYS United States Patent Office 2,765,040
Patented Oct. 2, 1956

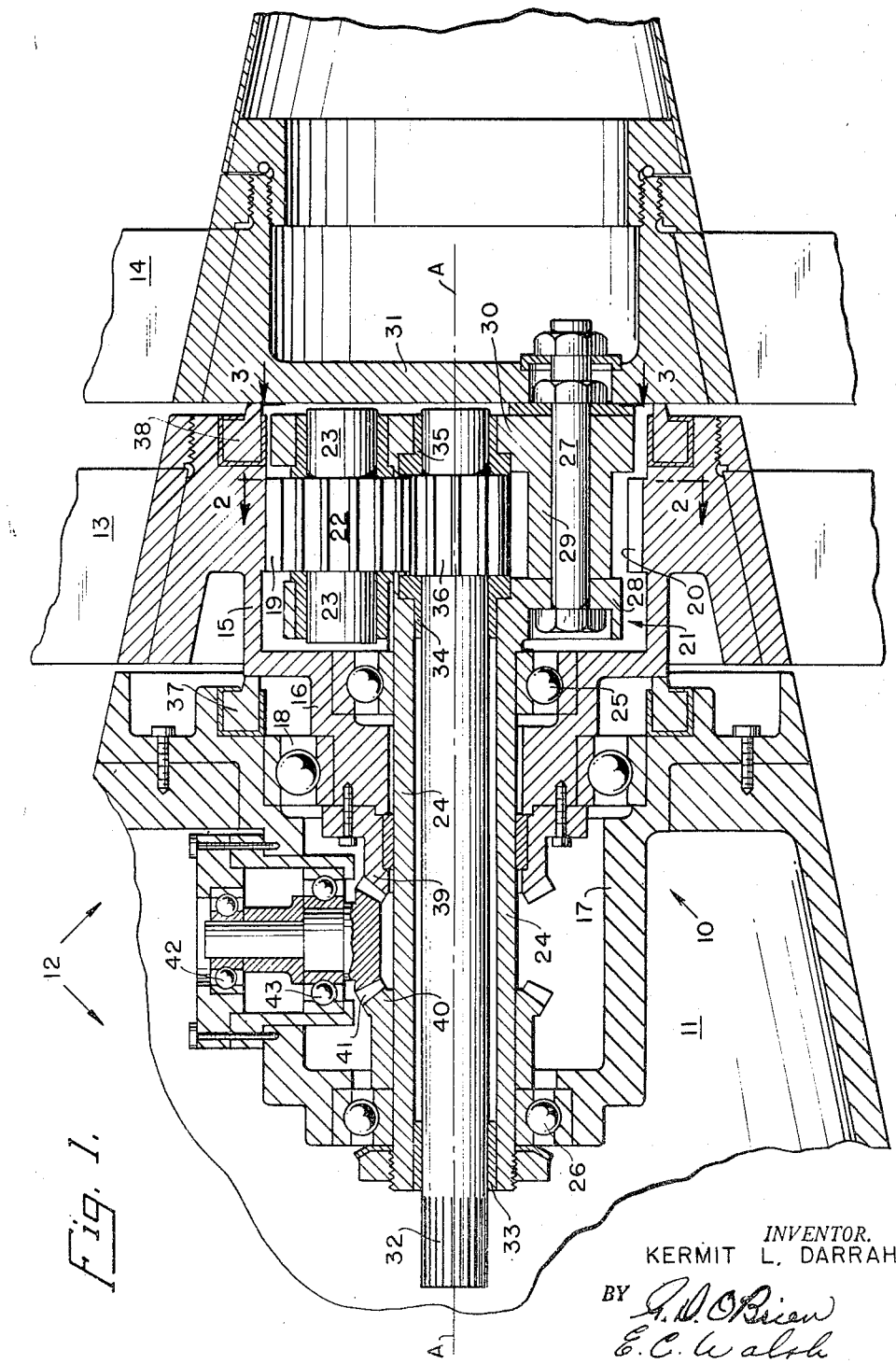

2,765,040

COUNTER-ROTATING PROPELLER DRIVE

Kermit L. Darrah, Lynnfield Center, Mass., assignor, by mesne assignments, to the United States of America as represented by the Secretary of the Navy Application September 28, 1953, Serial No. 382,880

1 Claim. (Cl. 170—135.28)

This invention relates to torpedoes and more particularly to power transmission systems interconnecting a torpedo prime mover and the torpedo propellers.

One of the objects of the invention is to provide an improved power transmission and speed reducer for torpedoes which effects rotation of the torpedo propellers at the same angular velocity in opposite directions.

Another object is to dispose the speed reducer within a propeller hub, thus utilizing normally wasted space.

Other objects are the provision of a power transmission having a minimum number of operating parts, which is compact, and economical of manufacture.

Still further objects, advantages, and salient features will become more apparent from a consideration of the description to follow, the appended claim, and the accompanying drawing, in which:

Fig. 1 is a longitudinal central section through the tail portion of a torpedo, taken on line 1—1, Fig. 2;

Fig. 2 is a section taken on line 2—2, Fig. 1;

Fig. 3 is a section taken on line 3—3, Fig. 1;

Fig. 4 is a section like Fig. 1 of an alternative form of the invention;

Fig. 5 is a section taken on line 5—5, Fig. 4; and

Fig. 6 is a section taken on line 6—6, Fig. 5.

Referring in detail to the drawing, and particularly Figs. 1 to 3, the invention comprises, in general, a power transmission and speed reduction unit 10, carried by the tail cone section 11 of a torpedo 12 which transmits power from any suitable prime mover (not shown), within the torpedo, to a pair of propellers 13, 14.

Propeller 13 is provided with a hub 15 having an axial projection 16 journaled for rotation relative to housing 17 about axis A by bearing 18, the hub having internal gear teeth 19, forming a ring gear 20 of a planetary or epicylic gear train. A spider assembly 21, having angularly spaced planet pinions 22, 22a, 22b, journaled thereto by shafts 23, 23a, 23b, respectively, and meshing with gear 20, is supported for rotation about axis A by a tubular projection 24 extending through bearings 25, 26. Propeller 14 is secured to the spider assembly for rotation therewith by bolts 27, 27a, 27b which extend through inner flange 28, spacers 29, 29a, 29b, and outer flange 30 of the spider assembly and through hub portion 31 of propeller 14. Power input shaft 32, the forward end of which is connected to the prime mover in any conventional manner (not shown), is journaled for rotation about axis A in bushings 33, 34, 35 and is provided with a sun pinion 36 which meshes with the planet gears. Suitable seals 37, 38 prevent entry of water into the housing and gearing.

In the construction so far described it will be apparent that with shaft 32 rotating, the propellers would rotate in opposite directions at angular speeds less than that of shaft 32 but would not necessarily rotate at the same angular speed. To effect positive constraint of the propellers to the same angular speed, two alternative constructions are employed which will now be described.

As best shown in Fig. 1, one of the embodiments just referred to comprises a bevel gear 39 secured to projection 16 for rotation therewith, a bevel gear 40, having the same number of teeth as gear 39, secured to projection 24 for rotation therewith, and a bevel gear 41, meshing with gears 39, 40 and journaled in the housing by bearings 42, 43. Since there is no relative rotation between gear 39 and propeller 13, and between gear 40 and propeller 14, and since gears 39, 40 have the same number of teeth and mesh with the same gear 41, it will be apparent that the propellers are constrained by gear 41 to rotate at the same speed in opposite directions.

In the alternative construction illustrated in Figs. 4 to 6, a spur gear 139 is affixed to projection 16 for rotation therewith, a spur gear 140 is affixed to projection 24 for rotation therewith, these gears being the counterparts of gears 39, 40, previously described, and meshing with a spur gear train 141, the counterpart of gear 41, gear train 141 comprising a pinion 141a meshing with gear 139, a pinion 141b, meshing with gear 140, the two pinions having the same number of teeth and meshing with each other as best shown in Fig. 6. Gears 139, 140 have the same number of teeth, and as will be apparent, will rotate at the same speed in opposite directions in the same manner as gears 39, 40. The construction of the reduction gearing, propellers, etc., employed in this alternative construction is identical to that of Fig. 1.

Obviously many modifications and variations of the present invention are possible in the light of the above teachings. It is therefore to be understood that within the scope of the appended claim the invention may be practiced otherwise than as specifically described.

What is claimed is:

A propulsion system for a torpedo, comprising a pair of tandem arranged propellers disposed at the rear end of the torpedo for rotation in opposite directions about a common axis, the forward propeller having a hollow hub with an internal ring gear affixed therein, a sun gear disposed within the hub for rotation about said axis, a planet gear assembly disposed within the hub for rotation about said axis having a plurality of angularly spaced planet gears rotatably supported thereby and meshing with the ring gear and sun gear, the rearward propeller being carried by and directly connected to the planet gear assembly for rotation therewith, a first gear affixed to the hub of the forward propeller for rotation therewith, a second gear having the same number of teeth as the first gear affixed to the planet assembly for rotation therewith, and gear means meshing with said first and second gears for constraining them to rotate in opposite directions at the same angular speeds, whereby the propellers rotate in opposite directions at the same angular speeds.

References Cited in the file of this patent

UNITED STATES PATENTS

| | | |
|---|---|---|
| 1,434,620 | McCain | Nov. 7, 1922 |
| 1,966,382 | Donohue, Jr. | July 10, 1934 |
| 2,186,064 | Dekker | Jan. 9, 1940 |
| 2,275,599 | Armitage et al. | Mar. 10, 1942 |

FOREIGN PATENTS

| | | |
|---|---|---|
| 880,103 | Germany | June 18, 1953 |